(12) United States Patent
Smith

(10) Patent No.: US 8,845,325 B1
(45) Date of Patent: Sep. 30, 2014

(54) OXYGEN CANDLE FURNACE IGNITION FITTING

(75) Inventor: Matthew J. Smith, Springfield, PA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 602 days.

(21) Appl. No.: 13/280,096

(22) Filed: Oct. 24, 2011

Related U.S. Application Data

(60) Provisional application No. 61/406,783, filed on Oct. 26, 2010.

(51) Int. Cl.
*F23Q 1/00* (2006.01)

(52) U.S. Cl.
USPC ........... 431/267; 431/153; 431/202; 431/269; 431/270; 431/356; 126/263.01; 422/120; 422/305

(58) Field of Classification Search
CPC ............. A62B 21/00; A62B 7/08; A62B 9/02
USPC ................. 431/267, 153, 202, 269, 270, 356; 126/263.01; 422/120, 305
See application file for complete search history.

(56) References Cited

U.S. PATENT DOCUMENTS

| | | | | |
|---|---|---|---|---|
| 2,507,450 | A * | 5/1950 | Millikan et al. | 128/202.26 |
| 2,921,521 | A * | 1/1960 | La Haye et al. | 102/531 |
| 2,983,588 | A * | 5/1961 | Bovard | 422/126 |
| 3,356,320 | A * | 12/1967 | Webb | 244/122 AH |
| 3,356,492 | A * | 12/1967 | Delange et al. | 75/399 |
| 3,385,672 | A | 5/1968 | McGoff | |
| 3,565,068 | A * | 2/1971 | Bickford | 128/201.25 |
| 3,592,378 | A * | 7/1971 | Petraglia | 228/51 |
| 3,607,122 | A * | 9/1971 | Hwoschinsky | 422/120 |
| 3,756,785 | A * | 9/1973 | Netteland | 22/120 |
| 3,881,394 | A * | 5/1975 | Netteland | 89/1.14 |
| 4,069,021 | A | 1/1978 | Schneider | |
| 4,138,218 | A * | 2/1979 | McClure, III | 422/120 |
| 4,246,229 | A * | 1/1981 | McBride et al. | 422/122 |
| 4,278,637 | A * | 7/1981 | McBride | 422/122 |
| 4,342,725 | A | 8/1982 | Collins | |
| 4,409,978 | A * | 10/1983 | Bartos | 128/205.12 |
| 4,548,730 | A * | 10/1985 | Koslow | 252/186.43 |
| 4,794,923 | A * | 1/1989 | Bartos | 128/205.24 |
| 5,620,664 | A | 4/1997 | Palmer | |
| 5,725,834 | A * | 3/1998 | Nishii et al. | 422/126 |
| 5,772,976 | A * | 6/1998 | Cortellucci et al. | 423/579 |
| 6,003,416 | A * | 12/1999 | Ando et al. | 82/160 |
| 6,155,254 | A * | 12/2000 | Evrard et al. | 128/202.26 |
| 6,416,720 | B1 * | 7/2002 | Cannon | 422/120 |
| 2005/0066833 | A1 * | 3/2005 | Hamilton | 102/202.5 |
| 2005/0238546 | A1 | 10/2005 | Holmes | |

* cited by examiner

*Primary Examiner* — Jorge Pereiro
(74) *Attorney, Agent, or Firm* — Dave A. Ghatt

(57) ABSTRACT

An apparatus for lighting an oxygen candle within a drum and for sealing the drum of an oxygen candle furnace. The apparatus includes a housing member for positioning the ignition assembly on a lid of the drum. The housing member having an upper portion, a lower portion and a borehole extending through the upper and lower portions. An ignition nail is placed in the borehole and housing member is structured to hold prevent the ignition nail from moving laterally, and to automatically align the nail with the oxygen candle within the drum.

7 Claims, 6 Drawing Sheets

OXYGEN CANDLE FURNACE IGNITION FITTING

CROSS-REFERENCE TO RELATED APPLICATIONS

This application claims the benefit of U.S. Provisional Application No. 61/406,783, filed Oct. 26, 2010, which is incorporated herein by reference.

STATEMENT OF GOVERNMENT INTEREST

The following description was made in the performance of official duties by employees of the Department of the Navy, and, thus the claimed invention may be manufactured, used, licensed by or for the United States Government for governmental purposes without the payment of any royalties thereon.

TECHNICAL FIELD

The invention is directed to an arrangement for igniting an oxygen candle furnace and also for providing a proper and long lasting seal for the furnace thereafter.

BACKGROUND

The use of chlorate candles, also known as oxygen candles, for generating and supplying oxygen to closed spaces is well known. An example of a known oxygen candle furnace arrangement is illustrated in U.S. Pat. No. 3,385,672, which outlines various elements of an oxygen candle furnace, such as the hollow metal drum within which the candle burns. The hollow metal drum is typically covered with a metal lid which has a sealing gland thereon. The sealing gland helps to seal and maintain the integrity of the furnace. However, the patent does not describe or illustrate elements of the "sealing gland" fitting.

FIG. 1 is an exploded view of the typical prior art sealing gland 10. As shown, the sealing gland 10 includes a brass bulkhead fitting 25 having two threaded sections 20 and 40, separated by a hexagonal middle section 30 that may be gripped with a wrench during installation. The hexagonal middle section 30 also provides a bearing surface for fastening to the lid 15 of an oxygen candle furnace. The sealing gland 10 may be secured to the lid 15 by a washer and nut on the underside of the lid. As shown in FIG. 1, inside the sealing gland is a small brass washer 50, a coil of heat-resistant fiberglass yarn 55, and a brass ferrule 60. A brass compression nut 70 is threaded over the top portion of the bulkhead fitting. The coil of fiberglass yarn 55 rests on the washer 50, and is compacted by the nut 70 and ferrule 60. In operation, the fiberglass yarn 55 is located below the lid and within the furnace.

FIG. 1 also shows a borehole 80 through which an igniter nail extends. The fiberglass yarn 55 is intended to prevent combustion products from escaping the furnace via the borehole 80. Because the diameter of the borehole 80 is significantly wide, as compared to the diameter of the igniter nail, the fiberglass yarn 55 provides friction to secure the igniter nail in place and to restrict lateral movement thereof, before and during oxygen production. However, the fiberglass yarn 55 deteriorates due to high temperatures and exposure to combustion products. The location of the fiberglass yarn 55 within the furnace also contributes to its deterioration. The sealing gland 10 is not easily maintainable and difficult to support logistically. As the yarn deteriorates the passageway though the borehole 80 opens up. Thus, the bulkhead fitting does not function as a sealing gland, and does not securely hold the igniter nail. Smoke freely escapes the furnace through the opening. When this happens, operators are forced to bend the nail to hold it in place, which is undesirable as a bent nail is difficult to use for ignition, and often damages the oxygen candle. Alternatively, an external device, such as a binder clip may be used to secure the nail, which is also undesirable because typically, the igniter nail is not securely supported. Catastrophic failures of furnaces have been recorded when an improperly secured nail has fallen through a deteriorated sealing gland and has been consumed in the furnace, allowing a release of hot combustion products through the breach in the lid. Thus, it is desired to have a more secure means of holding the ignition nail and sealing an oxygen candle furnace arrangement.

SUMMARY OF THE INVENTION

In one aspect, the invention is a furnace arrangement. The furnace arrangement includes a drum defining a furnace area within. The furnace arrangement also includes a lid for covering the drum, the lid having an opening in a substantially central portion of the lid. In this aspect the furnace arrangement also includes an ignition assembly extending through the lid. The ignition assembly includes a housing member having, an upper portion above the lid, a lower portion extending through the lid, and a borehole extending from the upper portion to the lower portion of the housing member. The lower portion includes a lower threaded outer surface for securing the housing member to the lid. The upper portion includes a threaded hole within, wherein the threaded hole intersects and is substantially perpendicular to the borehole. The housing also includes a ball plunger assembly having a threaded outer surface threadingly mating within the threaded hole of the upper portion of the housing member, the ball plunger assembly further including a spring loaded ball plunger biased in a direction substantially parallel to the threaded hole of the upper portion. In this aspect, the ignition assembly further includes a nail having a head end and a pointed end, the nail extending through the borehole of the housing in an orientation so that the nail head is within the furnace area and the pointed end is above the lid, wherein the ball plunger contacts the nail and is biased to lock the nail within the borehole.

In another aspect, the invention is an ignition assembly for lighting an oxygen candle within a drum and for sealing the drum. The ignition assembly includes a housing member for positioning the ignition assembly on a lid of the drum. The housing member includes an upper portion for above the lid and a lower portion for extending through the lid. The housing also includes a borehole extending from the upper portion to the lower portion of the housing member. The lower portion includes a lower threaded outer surface for securing the housing member to the lid. The upper portion includes a threaded hole within, wherein the threaded hole intersects and is substantially perpendicular to the borehole. The housing also includes a ball plunger assembly having a threaded outer surface threadingly mating within the threaded hole of the upper portion of the housing member, the ball plunger assembly further including a spring loaded ball plunger biased in a direction substantially parallel to the threaded hole of the upper portion. In this aspect, the ignition assembly further includes a nail having a head end and a pointed end, the nail extending through the borehole of the housing in an orientation so that the nail head is below the pointed end, and wherein the ball plunger contacts the nail and is biased to lock the nail within the borehole.

BRIEF DESCRIPTION OF DRAWING

A more complete appreciation of the invention and many of its attendant advantages will be readily appreciated as the same becomes better understood by reference to the following detailed description when considered in connection with the accompanying drawing wherein.

DETAILED DESCRIPTION

Figure 2:
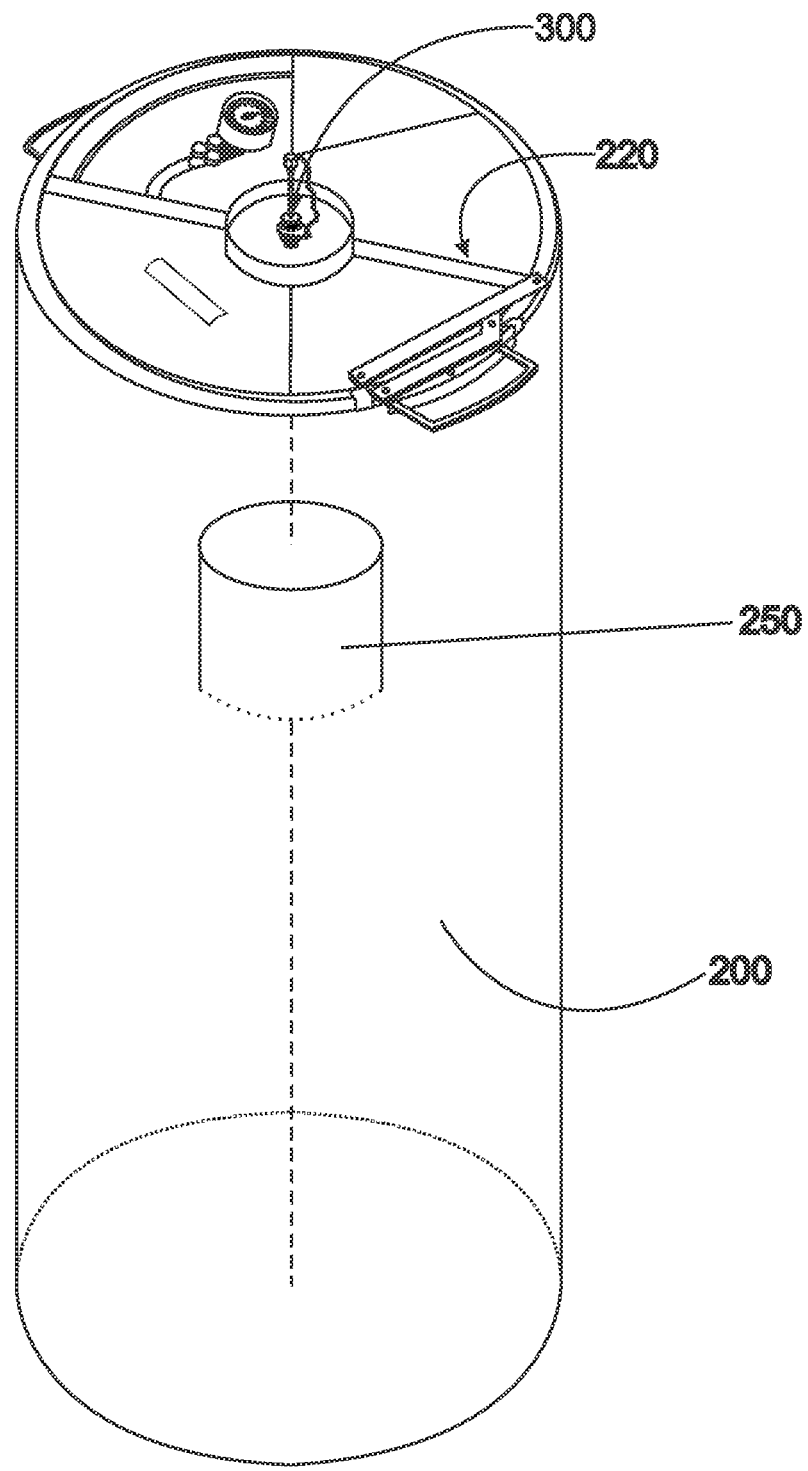
FIG. 2 is a perspective illustration of an oxygen candle furnace having an ignition assembly, according to an embodiment of the invention.

The invention is directed to an arrangement for igniting an oxygen candle furnace, and for providing a proper and long lasting seal for the furnace. FIG. 2 is a perspective illustration of an oxygen candle furnace 100 having an ignition assembly 300 according to an embodiment of the invention. The furnace is used to provide oxygen to closed spaces. The oxygen candle furnace may be used in different applications such as in submarines, airplanes, spacecrafts, and survival chambers in mines.

As shown in FIG. 2, the oxygen candle furnace 100 includes a hollow metallic drum or container 200. Although FIG. 2 shows the drum 200 being cylindrical, the drum may be any desired shape, so long as it accommodates all its internal elements. The drum 200 defines a furnace area therewith. FIG. 2 also shows a lid 220 that covers and seals the drum 200. The lid 220 may be removably attached to the drum 200. Therefore, latching mechanisms around the circumference of the upper edge of the drum 200 and around the circumference of the lid 220 allow for securing the lid 220 to the drum 200. These latching mechanisms also allow for the removal of the lid 220 from the drum 200. The removal of the lid 220 allows for access to components on at the bottom surface of the lid, and also for easy access to components within the drum 200. In another embodiment, the lid 220 may be hinged to the drum 200.

The oxygen candle furnace 100 also includes an ignition assembly 300, which as shown is attached to the lid 220 and extends through an opening in the lid 220. The opening in the lid 220, through which the ignition assembly 300 extends, may be located at a substantially central part of the lid. FIG. 2 also shows an oxygen candle 250 within the drum. It should be noted that the candle 250 is only schematically illustrated. Oxygen candles 250 may typically be a chlorate candle or the like. The candles 250 may be about 11 3/8 in to 11 5/8 in high and have a diameter of about 6 1/8 in. Within the drum 200, oxygen candles 250 may be vertically stacked on top of each other. As shown by the dotted line and as will be outlined below, the candle 250 is vertically aligned with the ignition assembly 300.

Figure 3A:
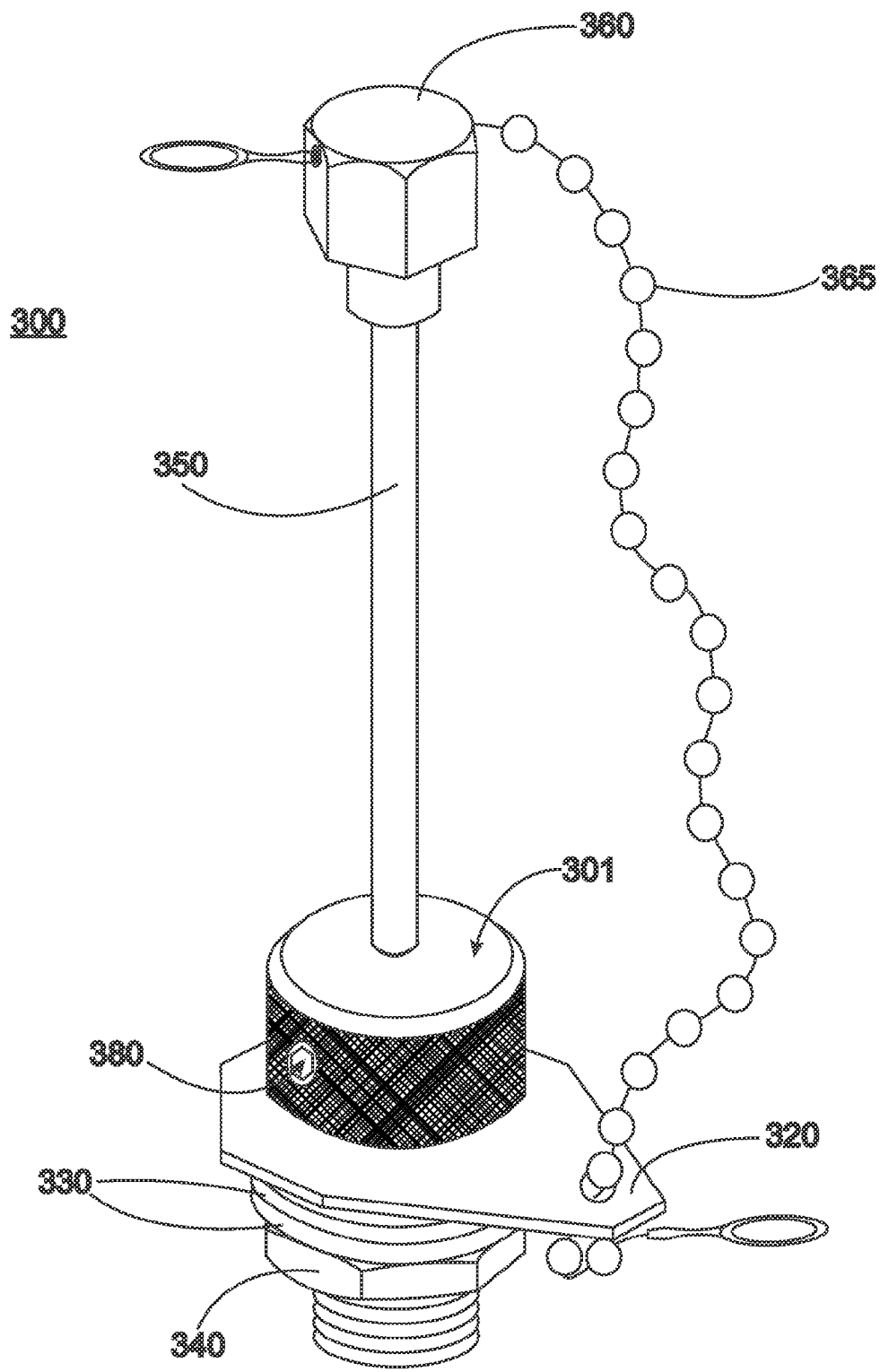
FIG. 3A is an isometric view of an ignition assembly according to an embodiment of the invention.

FIG. 3A is an isometric view of an ignition assembly 300 according to an embodiment of the invention. FIG. 3A shows the ignition assembly 300 having a housing member 301 that provides support for the entire ignition assembly arrangement. The ignition assembly 300 also includes a safety plate 320, first and second washers 330, and a nut 340. FIG. 3A also shows an igniter nail 350 extending through the housing member 301, and a removable nail holder 360 for holding a pointed end of the nail 350. A chain 365 attaches the removable nail holder 360 to the safety plate 320.

Figure 3B:
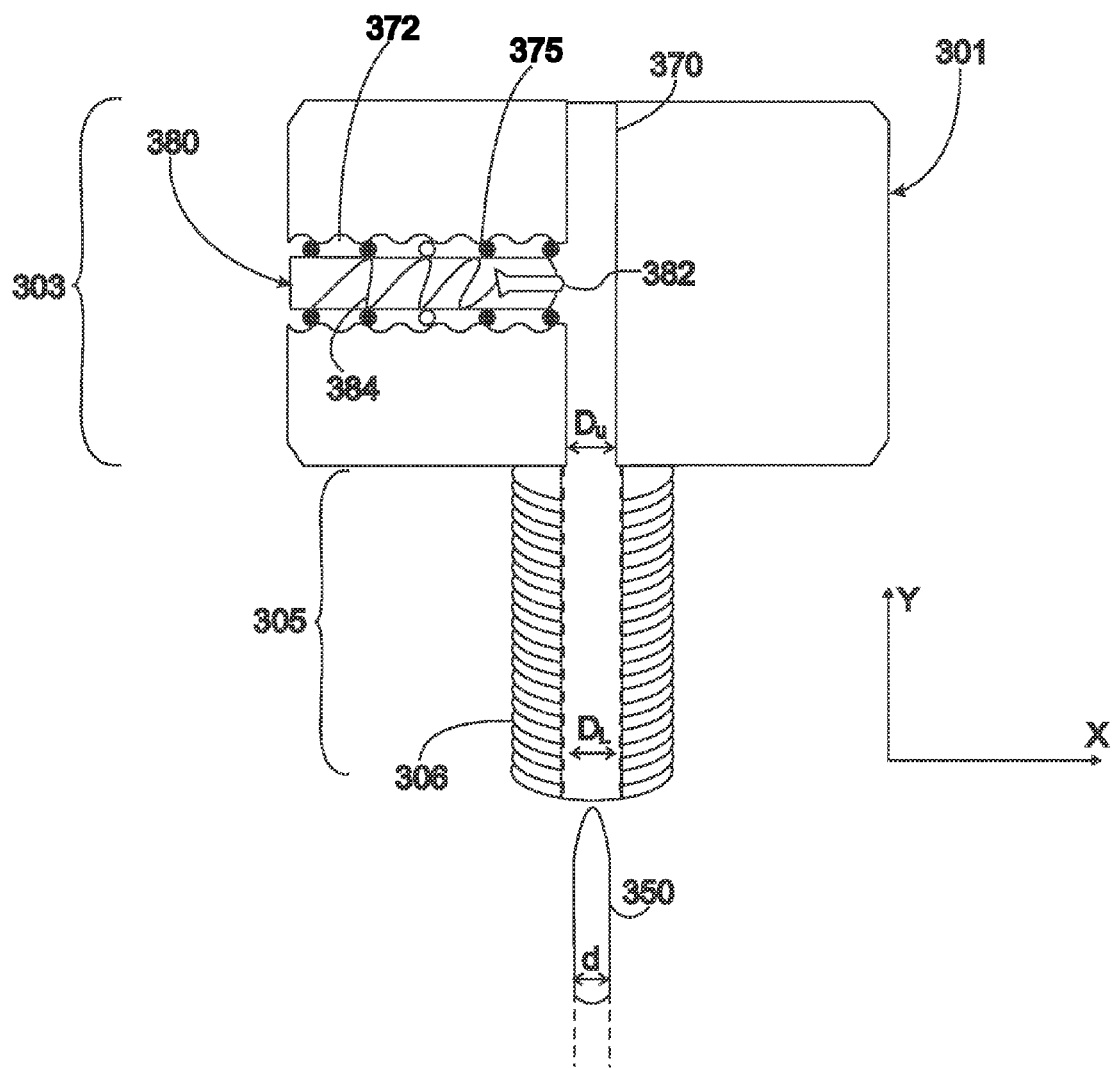
FIG. 3B is a perspective illustration of the housing member of the ignition assembly, according to an embodiment of the invention.

FIG. 3B is a perspective sectional illustration of the housing member 301 shown in FIG. 3A, according to an embodiment of the invention. The housing member 301 includes an upper portion 303 and a lower portion 305, with a borehole 370 extending in the Y direction from the upper portion 303 through to the lower portion 305. The borehole 370 is provided to accommodate the igniter nail 350. As shown, the borehole 370 has an upper portion diameter $D_U$ and a lower portion diameter $D_L$, with the lower portion diameter $D_L$ being larger than the upper portion diameter $D_U$. According to this embodiment, when an igniter nail 350 is inserted, both upper and lower portions accommodate the igniter nail 350. The upper portion diameter $D_U$ prevents lateral movement of the nail 350. (As outlined below, the lower portion diameter $D_L$ may also prevent lateral movement of the nail 350.) The nail has a width d, which is almost equal, but slightly smaller than the diameter $D_U$ of the borehole in the upper portion 303. The difference in diameters allows the nail 350 to have a substantially exact fit in the upper portion of the borehole 370. This substantially exact fit prevents lateral movement in the X direction, with respect to the borehole 370, when the nail is inserted into the borehole 370. The slightly larger lower portion diameter $D_L$ accommodates for gripper marks near the head of most types of nails. These gripper marks are produced during the manufacturing of the nails and result in a slightly increased diameter, larger than d, near the head of the nail. This slightly increased nail diameter may be almost equal, but slightly smaller than the diameter $D_L$ of the borehole in the lower portion 305, thereby preventing lateral movement of the nail 350. The larger diameter $D_L$ of the lower portion 305 also makes it easier for a user to insert the igniter nail 350 into the housing 301 because as outlined below, the pointed end of the nail 350 is first inserted into the lower portion 305, then through the upper portion 303.

It should be noted that according to another embodiment of the invention, the diameters $D_U$ and $D_L$ may be the same. According to this embodiment the borehole 370 is constant along the length of housing 301. The difference in diameters allows the nail 350 to have a substantially exact fit in the upper and lower portions of the borehole 370. This substantially exact fit prevents lateral movement in the X direction.

FIG. 3B also shows the upper portion 303 having a threaded hole 372 extending in the X direction. As shown, the threaded hole 372 is substantially perpendicular to, and intersects with the borehole 370. FIG. 3B also shows a ball plunger assembly 380, which is disposed within the threaded hole 372. FIG. 3B also illustrates a cylindrical coil 375 inserted into the threaded hole 372. The ball plunger assembly 380 is then threaded onto the cylindrical coil 375, within the hole 372. The cylindrical coil 375 may be a screw-lock HELI-COIL® in which one of the loops of the cylindrical coil is hexagonal instead of round. According to this embodiment, when the ball plunger assembly 380 is threaded onto the cylindrical coil 375, the hexagonal loop bites into the outer surface of the ball plunger assembly body 380, preventing the ball plunger assembly 380 from freely rotating. The cylindrical coil 375 may be made from a steel alloy that is resistant to corrosion and galling, such as for example NITRONIC 60®. According to another embodiment of the invention, the ball plunger assembly 380 may be threaded directly onto the surface of the threaded hole 372, without a cylindrical coil.

As shown, the ball plunger assembly 380 includes a round-nose plunger 382 that is biased in direction X towards the borehole 370. FIG. 3B also shows a biasing member 384, such as a spring, pushing the round-nose plunger towards the borehole 370. FIG. 3B shows the round-nose plunger 382 disposed within the borehole 370. When the igniter nail 350 is inserted into the borehole 370, because of the biasing arrangement, nail 350 pushes the plunger 382 back out of the borehole 370. However because of the spring biasing, the round-nose plunger 382 maintains contact and pushes against the nail 350, thereby preventing the nail from moving in the Y direction, without user intervention.

Figure 4:
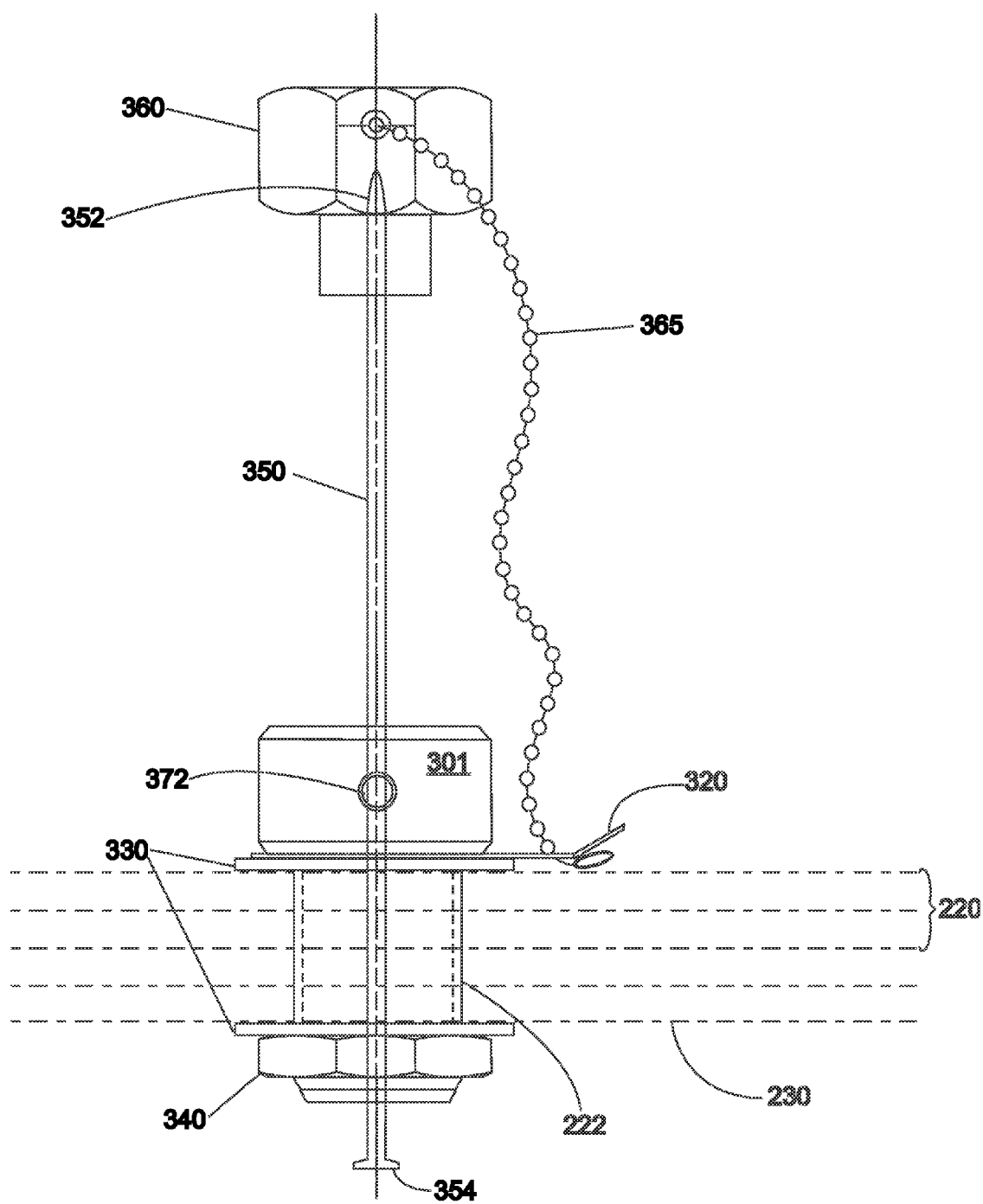
FIG. 4 is a sectional view of an ignition assembly attached to the lid of an oxygen candle furnace, according to an embodiment of the invention.

The lower portion 305 of the housing includes a threaded outer surface 306, which as outlined below, and illustrated in FIG. 4, is used to secure the housing to the lid 220. It should be noted that the elements of the housing member 301 may be any desired material that provides the strength and the heat resistance suitable for use in the oxygen candle furnace. According to an embodiment of the invention, the housing is a brass material, but may alternatively be a metal such as stainless steel or the like, so long as the material is sufficiently heat and corrosion resistant.

Figure 3C:
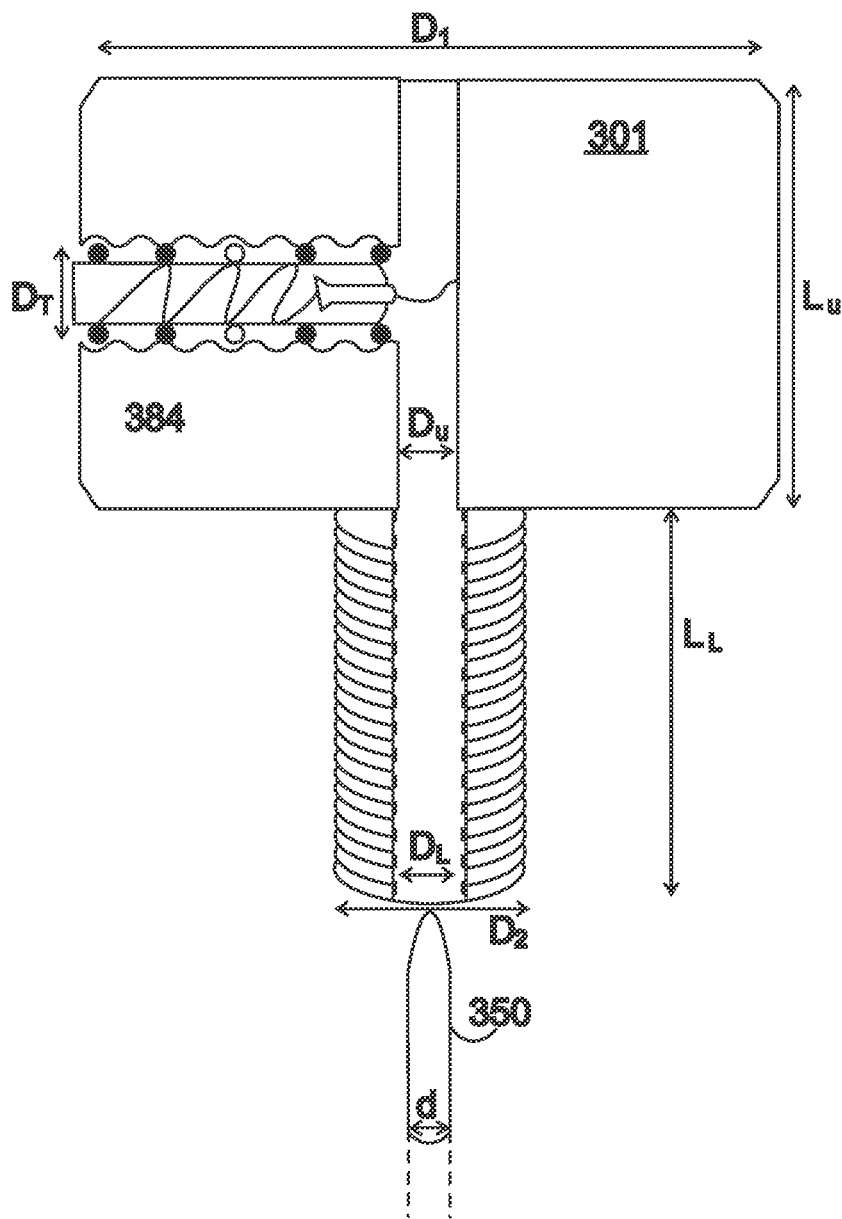
FIG. 3C is a perspective illustration of the housing member of the ignition assembly showing different dimensions, according to an embodiment of the invention.

FIG. 3C is an illustration of the housing member 301, showing possible dimensions, according to an embodiment of the invention. As shown, the housing member 301 has a diameter of $D_1$ at the top of the upper portion 303 of the housing 301, and a diameter of $D_2$ at the bottom of the lower portion. The housing member 301 also has an upper portion length of $L_U$ and a lower portion length of $L_L$. FIG. 3C also shows a threaded diameter of $D_T$ for the threaded hole 372. FIG. 3C also shows the aforementioned borehole diameters $D_U$ and $D_L$.

The dimensions may vary according to specific applications. For example, according to one embodiment $D_1$ may be about 1.0 in to about 1.5 in, and $D_2$ may be about 0.6 in to about 0.90 in. According to this embodiment, the upper portion length $L_U$ may be about 0.6 in to about 0.90 in, and the lower portion length $L_L$ may also be about 0.6 in to about 0.90 in. According to this embodiment, the threaded hole diameter $D_T$ may be about 0.213 in to about 0.319 in. The borehole diameter $D_U$ may be about 0.125 in to about 0.187 in, and the borehole diameter $D_L$ may be about 0.176 in to about 0.264 in. According to one specific embodiment, $D_1$ may be about 1.25 in, and $D_2$ may be about 0.75 in. According to this specific embodiment, the upper portion length $L_U$ may be about 0.75 in, and the lower portion length $L_L$ may also be about 0.75 in. According to this specific embodiment, the threaded hole diameter $D_T$ may be about 0.266 in. The borehole diameter $D_U$ may be about 0.156 in and the borehole diameter $D_L$ may be about 0.22 in.

FIG. 4 is a sectional view of the ignition assembly 300 attached to the lid 220 of an oxygen candle furnace 100, according to an embodiment of the invention. As shown, the upper portion 303 of the housing 301 is positioned above the lid 220 and the lower portion 305 extends through the lid 220 and into the furnace area. The lower portion 305 extends through a lid opening 222 that as outlined above may be located at a substantially central portion of the lid. The lid opening 222 has a diameter that allows the lower portion 305 to be pushed through the opening 222, and secured to the lid 220 with a nut 340, as outlined below. According to another embodiment, the opening 222 may have a threaded perimeter that threadingly mates with the threaded outer surface 306 of the lower portion.

When the housing 300 is attached to the lid 220 as shown in FIG. 4, the safety plate 320 is positioned above the lid 220, with the safety plate having a top surface that abuts against the upper portion 303 of the housing. Also shown, a first of the washers 330 is sandwiched between the safety plate 320 and the lid 220. FIG. 4 also shows a baffle 230 positioned below the lid 220 for providing a thermal protective layer. During operation, the oxygen candle material sprays, and the baffle 230 is included to receive the hot material, significantly reducing the temperature of the lid, preventing injury and degradation of the lid. The fastening arrangement also includes the nut 340 which is fastened around the threaded outer surface 306 of the lower portion 305. The second washer 330 is sandwiched between the nut 340 and the baffle 230. This arrangement secures the housing 301 to the lid 220.

Figure 1:
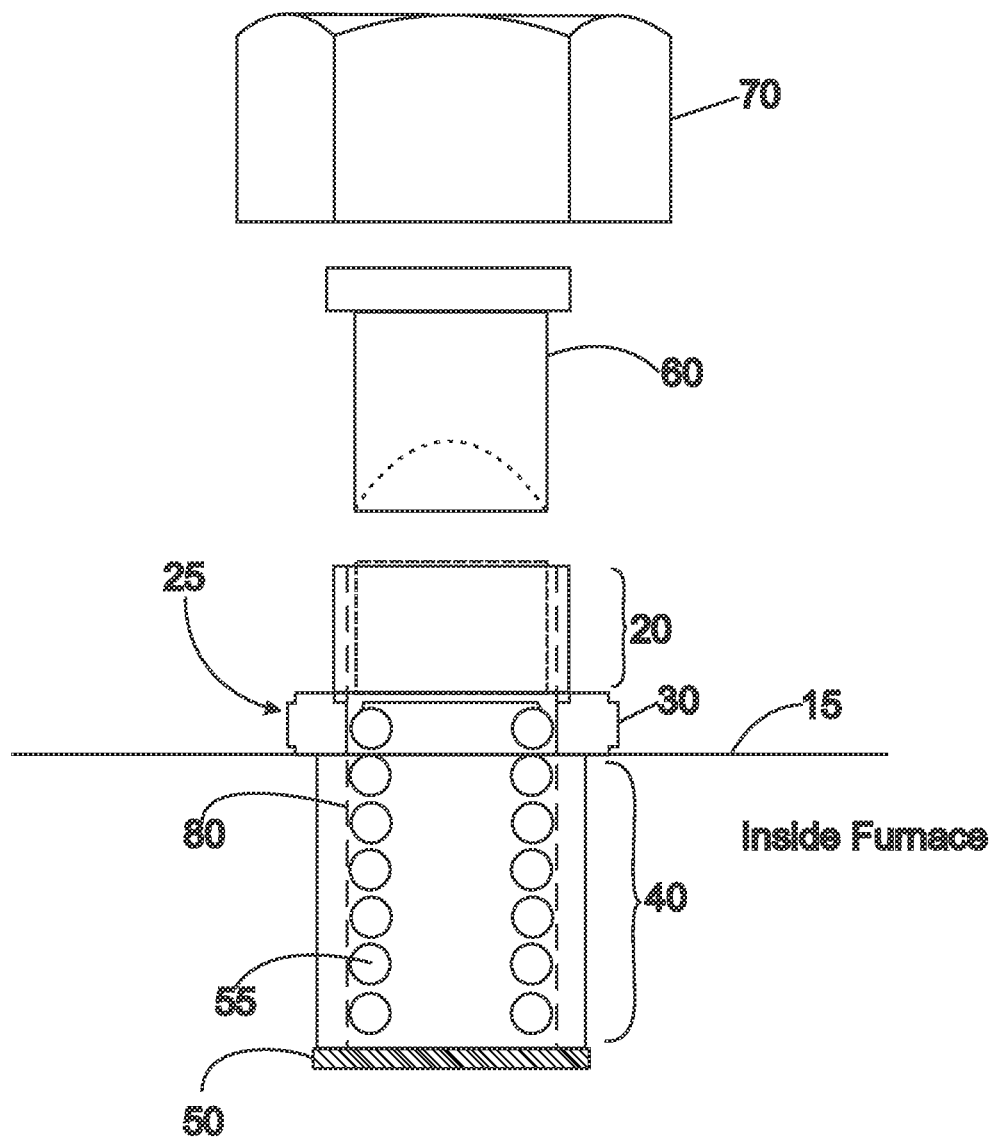
FIG. 1 is a prior art illustration of a sealing gland.

FIG. 4 shows the igniter nail 350 with the pointed end 352 extending through the lid 220 and positioned above the lid, and the head end 354 below the lid. In operation when a candle is to be ignited, a user may remove the lid 220. The igniter nail is then inserted via the pointed end 352 into the borehole of the housing. When the pointed end 352 of the nail 350 is pushed through the upper portion of the housing, the nail holder 360 may be placed over the pointed end, thereby providing a means for a user to grip and to manipulate the nail. As outlined above with respect to FIG. 3B, when the igniter nail 350 is inserted into the borehole 370, the round-nose plunger 382 pushes against the nail 350, thereby preventing the nail from moving in the Y direction, without user intervention. The location of this mechanism for holding the nail in place, i.e., the ball plunger assembly 380, which is outside of the furnace, is advantageous because it is away from the direct heat dissipated by the furnace. This arrangement including the ball plunger assembly 380, significantly outlast the fiberglass arrangement 55 of the prior art, shown in FIG. 1, only failing after the spring 384 has endured hundreds of thousands of cycles. Note that the illustration of FIG. 4 shows the ball plunger assembly 380 going into the page.

The oxygen candle 250 may be lit when the lid 220 is properly secured to drum 200. A user may use the nail holder 360 to move the igniter nail 350 down in the Y direction into contact with the oxygen candle 250, wherein chemicals on the head end 354 of the nail react to ignite the candle 250. As outlined with respect to FIG. 2, and as shown in FIG. 4, the igniter nail 350 is vertically aligned with the candle 250, so the downward Y-direction movement automatically brings the nail head into contact with the candle. Additionally, as outlined above, because of the respective diameters $D_U$ and d of the upper borehole 370 and the nail 350, there is also no lateral movement of the nail 350 in the X direction.

After the candle is lit, the user may move the nail 350 upwards in the Y direction until the head end 354 abuts against the nut 340, covering the borehole 370, thereby sealing the furnace 100. Thus, the combination of the narrow borehole 370 having diameters ($D_U$, $D_L$) outlined above, and the proximity of the nail head 354 with respect to the borehole 370, and also the adhesion of reaction products to the nail head, all contribute to sealing the furnace, preventing almost all the smoke from escaping the furnace. Furthermore, even if the plunger fails during oxygen generation, the small borehole diameters ($D_U$, $D_L$) substantially prevent the escape of combustion products. Again, when the user releases the nail holder, the round-nose plunger 382 pushes against the nail 350, thereby preventing the nail from moving in the Y direction.

What has been described and illustrated herein are preferred embodiments of the invention along with some variations. The terms, descriptions and figures used herein are set forth by way of illustration only and are not meant as limitations. Those skilled in the art will recognize that many variations are possible within the spirit and scope of the invention, which is intended to be defined by the following claims and their equivalents, in which all terms are meant in their broadest reasonable sense unless otherwise indicated.

What is claimed is:

1. An ignition assembly for lighting oxygen candle within a drum and for sealing the drum, the ignition assembly comprising:
   a housing member for positioning the ignition assembly on a lid of the drum, the housing member comprising;
      an upper portion for above the lid,
      a lower portion for extending through the lid, and
      a borehole extending from the upper portion to the lower portion of the housing member, wherein the lower portion includes a lower threaded outer surface, the lower portion extending through an opening in the lid, for securing the housing member to the lid, and wherein the upper portion includes a threaded hole within, wherein the threaded hole intersects and is substantially perpendicular to the borehole; and
   a ball plunger assembly having a threaded outer surface threadingly mating within the threaded hole of the upper portion of the housing member, the ball plunger assembly further including a spring loaded ball plunger biased in a direction substantially parallel to the threaded hole of the upper portion;
   the ignition assembly further comprising a nail having a head end and a pointed end, the nail extending through the borehole of the housing in an orientation so that the nail head is below the pointed end, and wherein the ball plunger contacts the nail and is biased to lock the nail within the borehole.

2. The ignition assembly of claim 1, wherein a diameter of the borehole is almost equal to a diameter of the nail, to allow for a substantially exact fit of the nail within the borehole.

3. A furnace arrangement comprising:
   a drum defining a furnace area within;
   a lid for covering the drum, the lid having an opening in a substantially central portion of the lid; and
   an ignition assembly extending through the lid, wherein the ignition assembly comprises:
      a housing member comprising;
         an upper portion above the lid,
         a lower portion extending through the lid, and
         a borehole extending from the upper portion to the lower portion of the housing member, wherein the lower portion includes a lower threaded outer surface, the lower portion extending through the opening in the lid, for securing the housing member to the lid, and wherein the upper portion includes a threaded hole within, wherein the threaded hole intersects and is substantially perpendicular to the borehole; and
      a ball plunger assembly having a threaded outer surface threadingly mating within the threaded hole of the upper portion of the housing member, the ball plunger assembly further including a spring loaded ball plunger biased in a direction substantially parallel to the threaded hole of the upper portion;
   the ignition assembly further comprising a nail having a head end and a pointed end, the nail extending through the borehole of the housing in an orientation so that the nail head is within the furnace area and the pointed end is above the lid, wherein the ball plunger contacts the nail and is biased to lock the nail within the borehole.

4. The furnace of claim 3, wherein a diameter of the borehole is almost equal to a diameter of the nail, to allow for a substantially exact fit of the nail in the borehole.

5. The furnace of claim 4, wherein the ignition assembly further comprises:
   a safety plate above the lid, the safety plate having a top surface that abuts against the upper portion of the housing;
   a first washer sandwiched between the safety plate and the lid;
   a baffle below the lid having a top surface that abuts against the lid;
   a nut below the lid, fastened around the lower threaded outer surface of the lower portion of the housing member; and
   a second washer sandwiched between the nut and the baffle, wherein the lower threaded outer surface of the housing member extends through each of the safety plate, the first washer, the baffle, the nut, and the second washer.

6. The furnace of claim 5, further comprising a candle in the furnace area within the drum, wherein the candle is aligned with the ignition assembly so that the downward axial movement of the nail brings the nail head into contact with the candle, and upward axial movement of the nail brings the nail head into contact with the nut, thereby covering the borehole opening and sealing the drum.

7. The furnace of claim 5 further comprising a chain attached at one end to the safety plate, and at the other end to a nail holder.

\* \* \* \* \*